United States Patent

Van De Pavert

[11] Patent Number: 5,914,471
[45] Date of Patent: Jun. 22, 1999

[54] METHOD AND APPARATUS FOR RECORDING USAGE DATA OF CARD OPERATED DEVICES

[75] Inventor: Hendricus J. W. M. Van De Pavert, Zoetermeer, Netherlands

[73] Assignee: Koninklijke PTT Nederland N.V., Netherlands

[21] Appl. No.: 08/703,824

[22] Filed: Aug. 27, 1996

Related U.S. Application Data

[63] Continuation-in-part of application No. 08/274,838, Jul. 14, 1994, abandoned.

[30] Foreign Application Priority Data

Jul. 20, 1993 [NL] Netherlands ............................ 9301271

[51] Int. Cl.$^6$ ............................................. G06K 5/00
[52] U.S. Cl. ........................................... 235/380; 235/378
[58] Field of Search .................................... 235/378, 380, 235/382, 382.5; 379/145; 902/26, 28

[56] References Cited

U.S. PATENT DOCUMENTS

| | | |
|---|---|---|
| 3,869,700 | 3/1975 | Cook et al. . |
| 4,529,870 | 7/1985 | Chaum . |
| 4,746,786 | 5/1988 | Heberle et al. . |
| 4,780,602 | 10/1988 | Kawana et al. ......................... 235/380 |
| 4,864,109 | 9/1989 | Minematsu et al. .................... 235/379 |
| 4,900,903 | 2/1990 | Wright et al. . |
| 4,930,129 | 5/1990 | Takahira ............................... 371/40.4 |
| 5,012,076 | 4/1991 | Yoshida ................................. 235/379 |
| 5,051,564 | 9/1991 | Schmidt . |
| 5,120,939 | 6/1992 | Claus et al. . |
| 5,264,689 | 11/1993 | Maes et al. . |
| 5,266,782 | 11/1993 | Alanara et al. . |
| 5,359,182 | 10/1994 | Schilling ................................. 235/380 |
| 5,428,684 | 6/1995 | Akiyama et al. . |
| 5,479,637 | 12/1995 | Lisimaque et al. .................... 4/DIG. 1 |
| 5,495,098 | 2/1996 | Pailles et al. . |
| 5,644,118 | 7/1997 | Hayashida .............................. 235/379 |

FOREIGN PATENT DOCUMENTS

| | | |
|---|---|---|
| 0185365 | 6/1986 | European Pat. Off. . |
| 35 43 067 | 7/1986 | Germany . |
| 41 03 415 | 3/1992 | Germany . |
| 2172720 | 9/1986 | United Kingdom . |

*Primary Examiner*—Donald Hajec
*Assistant Examiner*—Mark Tremblay
*Attorney, Agent, or Firm*—Michaelson & Wallace; Peter L. Michaelson; John C. Pokotylo

[57] ABSTRACT

A method for recording usage data of a card-operated device, such as a public telephone set or a vending machine. In particular, usage data, such as totalized charges, is stored in a storage unit associated with the device. At the onset of a transaction, e.g., a telephone call, an initial balance, representing a existing pre-paid credit, is read from memory in the card and transferred to the device. Based upon usage of the device, during the course of the transaction and/or at its completion, the device instructs the card, at least once, to reduce its balance by, e.g., a fixed amount to yield a current balance, which is, in turn, then stored back into the card. The card then sends the current balance back to the device. Device usage for this transaction is subsequently determined, within the device, as a difference between the initial and current balances, and is added to (totalized) usage data stored therein. The security of the data transfers may be cryptographically enhanced. Preferably, the current balance is transmitted from the card to the device unit during a verification procedure through which the authenticity of the card is checked.

38 Claims, 9 Drawing Sheets

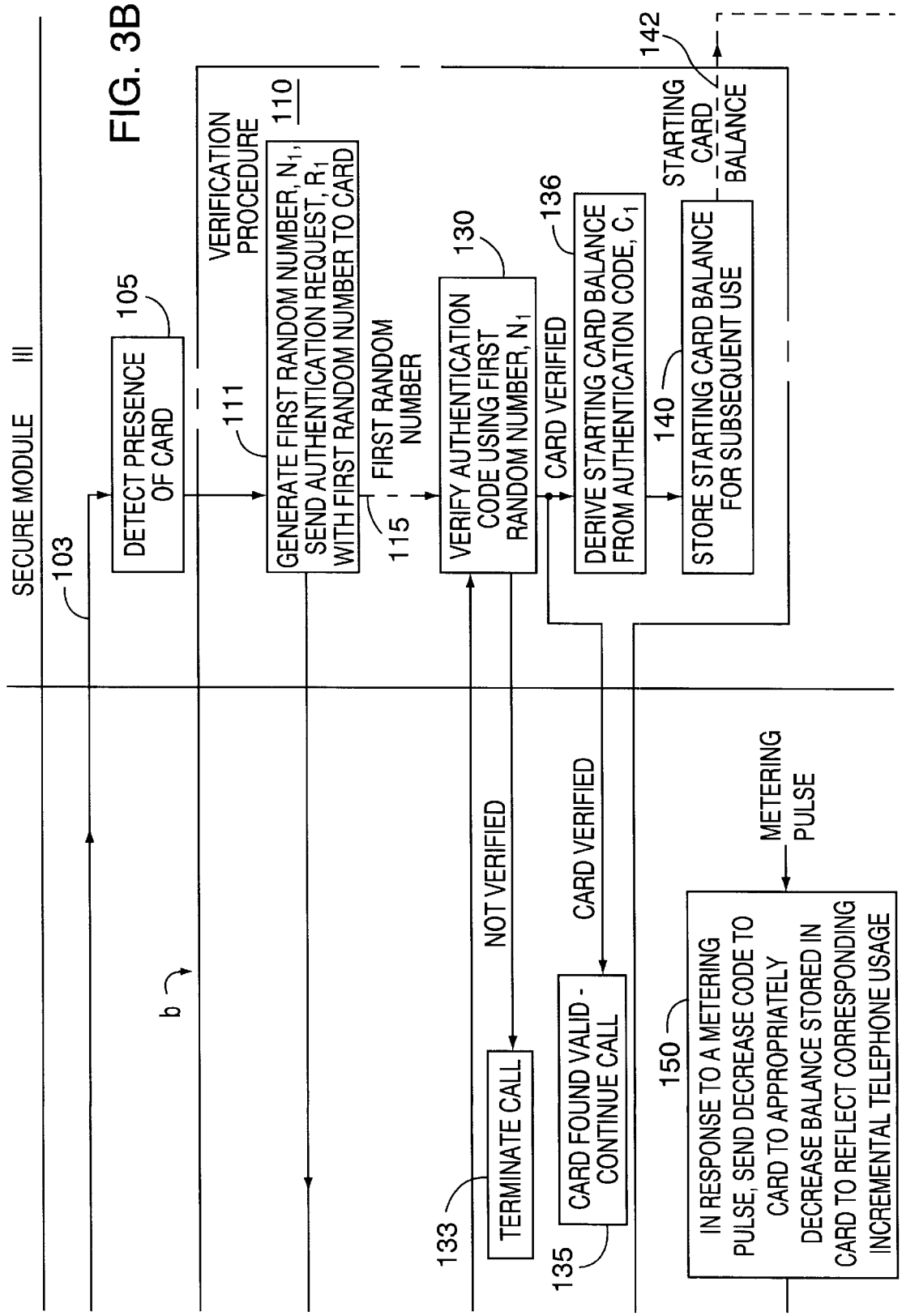

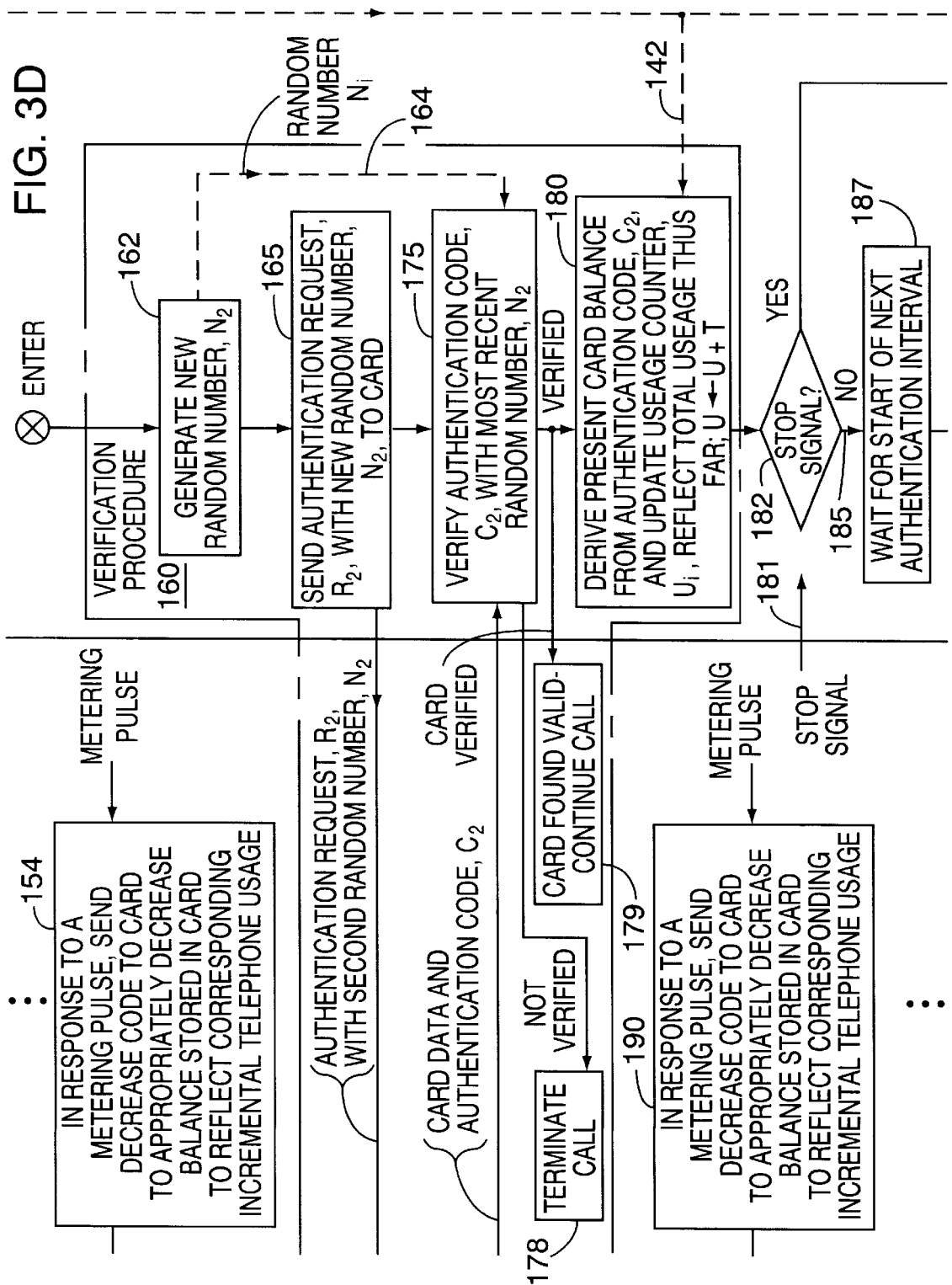

METHOD AND APPARATUS FOR RECORDING USAGE DATA OF CARD OPERATED DEVICES

CROSS-REFERENCE TO RELATED APPLICATION

This application is a continuation-in-part application of U.S. patent application Ser. No. 08/274,838; filed Jul. 14, 1994 and entitled "Method and Apparatus for Recording Usage Data of Card-operated Devices", now abandoned.

BACKGROUND OF THE INVENTION

1. Field of the Invention

The invention relates to a method for recording usage data of a card-operated device, the method comprising storing the usage data in a storage unit associated with the device. In particular, the invention relates to the secure storage of cost data in counters of public telephone sets of the type where a caller pays by means of a card, such as a so-called "chip" card. The invention also relates to recording usage data in general and cost data in particular for machines through which the purchaser pays by means of a card, such as, e.g., vending machines for sweets or for soft drinks, certain types of parking meters and stamp vending machines. In this context, the term "card" should be taken to refer to any type of card (or equivalent of a card) which enables the user to make use of the machine in question.

2. Description of the Prior Art

It is known in practice to equip pay telephone sets for public use ("pay phones") with a payment mechanism which settles payment by means of a card (e.g., phone card), such as a magnetic card or a "chip" card. On the card, a balance is stored in a magnetic strip or in a semiconductor memory. With each telephone conversation, the balance stored on the card is reduced, for example, with each metering pulse (billing pulse) of the telephone network or of the telephone set in question. This pulse may occur at a beginning of a minimum billing (charge) interval. Adjustment of the balance takes place, for a card having a semiconductor memory, by continually supplying the card with a pulse which causes a reduction of the balance, for example, by subtracting an amount from a stored value or by decreasing a content of an electronic counter internal to the card.

The number of telephone calls, the number of metering pulses and/or the amount of call charges can be recorded not only in the card, but also by a counter (or a different-type storage unit) associated with the pay phone itself. It is possible for such a counter not only to be located internally within the pay phone itself, but also to reside in a separate counting or recording device which is common to a number of pay phones but linked to the pay phones in question. Incidentally, a count of the charges is also kept in the telephone exchange to which a given pay phone in question is connected, but generally for other purposes. A counter, associated with a pay phone, of the type mentioned above may be used, not only, for example, for statistical purposes or for checking card balances, but also for settling call charges.

Such settling of charges may be carried out for various reasons. First, such charges may need to be shared with a commercial operator of a locality in which the pay phone in question is located, i.e., the commercial operator being paid part of the call charges. For example, it is standard practice in hotels and restaurants to impose a surcharge, which is ultimately paid to those establishments, for a caller's use of a pay phone situated there. Second, a settling of charges may be necessary with another telephone company if the caller makes use of a card of a telephone company different from that to which the pay phone in question is connected. The main instance that comes to mind here is the use of foreign cards, where it is necessary to settle the call charges with a foreign telephone company that carried a call made through the pay phone. Third, charges may need to be settled with a commercial operator of the pay phone itself—where that operator is not the telephone company to which that pay phone is connected but rather a different telephone company.

In the case of vending machines and the like, charges may be settled correspondingly with, for example, three parties; namely, the commercial operator of a locality where the machine is placed, the agency which has supplied the card, and a commercial operator of the machine. An example of a card-operated vending machine is described in German Patent Application DE-A-4 103 415. The vending machine described therein is provided with an additional card for recording operator revenues.

Card-operated devices are, however, subject to possible fraud, especially by mechanical and/or electronic manipulation of the card or the device. It is found that pay phones and vending machines are broken into with the possibility that the contents of their internal counters have been altered. There are also incidences of card balances being illegally increased so as to permit a card to be used for more and/or larger transactions than it should have been.

Consequently, reliable and fair settling of charges is obviously no longer possible in every instance. In the above-mentioned cases of the illicit use of a foreign card with a pay phone located in a certain commercially operated locality, the telephone company in question that owns the pay phone always loses revenue.

In conventional pay phones, each metering pulse or all the call charges are transmitted to the internal counter of the telephone set itself and subsequently to the card which has been inserted into the pay phone. The objective of doing so is to continually adjust, i.e., at each metering pulse, both the state of the counter of the pay phone and the balance of the card, thus permitting a subsequent balance of the card (and possible other usage data stored therein) to be checked. By means of suitable manipulations of the pay phone, the card could possibly be removed from the phone during an on-going telephone call, so that the call charges are no longer debited to the card. Although security procedures have been proposed which continually check the presence of the card, it is nevertheless not possible to guarantee that the charges recorded in the pay phone, as well as other data, will always track the data stored in the card. After all, metering pulses (or, in the case of a card equipped with a microprocessor, suitable instructions) could be transmitted to the card with the objective of reducing the balance on the card, but actually not reach the card owing to, for example, a technical fault or manipulation.

European patent application EP-A-0 185 365 discloses card-operated pay phones connected to a central computer, the computer providing data for verifying the authenticity of the card. The credit balance is written in the card at the end of a telephone call, but there is no guarantee that the actual balance so written is correct.

The publication W. Heberle and D. Lohner, "Öffentliches Kartentelefon für Wert- und Kreditkarten" (Public Card Telephone for Debit and Credit Cards), *NTZ Nachrichtentechnische Zeitschrift*, 1986 Vol. 39, No. 11 (Berlin) discloses card-operated pay phones in which the identity of the card is checked. Here, an "image" of a card is made. During a phone call, data recording is checked by repeatedly comparing this image with metering pulses received from an exchange. The identity of the image with the actual card can, however, not be guaranteed.

An electronic card-like based payment system for serving as an electronic surrogate for paper checks is disclosed in U.S. Pat. No. 4,529,870 (issued to D. Chaum on Jul. 16, 1985—hereinafter the "Chaum" patent). The system utilizes a card-like device and an interface, the latter being connected to an external financial system, such as a merchant's point-of-sale terminal or an on-line financial account system. The card-like device contains two basic stages: a secure (cryptographic) stage and a terminal stage—the latter effectively implementing a computer terminal to accommodate user interaction. In essence, for each payment and after suitable user authentication, this payment system obtains an electronic "check" number from the financial system. Once the check number has been received and the card-like device has debited its internal balance for the amount, the card-like device supplies payment instructions, including the payment amount and the electronic check number, via the interface, to the financial system in order to effectuate an electronic funds transfer to a payee. Inasmuch as this system relies on storing information, e.g., check number and payment amount, for each separate transaction to effectuate and later serve as proof of payment, this methodology is problematic with a variety of card-operated devices, such as pay phones and vending machines. Specifically, first, storing an individual record within the card-operated device of each and every different transaction effected therethrough necessitates a significant amount of memory, particularly where in the case of a pay phone each metering pulse (of which several will be involved in a typical long-distance call) will be viewed as a separate payment and hence as a different transaction. Second, if each separate charge, e.g., a metering pulse in a single telephone call, were to necessitate a separate "check", as ostensibly taught by the Chaum patent, then this would engender a significant amount of additional processing (and associated delay) in the card itself, the card-operated device and the financial system, thereby rendering this approach quite impractical for use in many card-operated devices, such as in a pay phone.

SUMMARY OF THE INVENTION

An effective check of the usage data stored on the card, in particular of the balance stored on that card, can only be achieved if it is known with certainty which usage data are stored on the card.

Hence, the object of the invention is therefore to overcome the above mentioned and other drawbacks of the prior art and specifically to provide reliable recording of usage data, in particular, charge data of card-operated devices. To this end, a method of securely recording usage data of a card-operated device comprises, according to the present invention, the steps of, broadly speaking: transferring usage data, e.g., an initial balance, from the card to the device; instructing the card to reduce its stored usage data (balance) to reflect a purchase or incremental use of the device so as to yield a current usage value or current balance (second usage data), the second usage data being derived from the transferred first usage data and the use-based charges made thereto; updating the stored usage data on the card to equal the current usage value; transferring third usage data (the current usage data, e.g., current balance) from the card to the device, the third usage data being derived from the second usage data; and storing fourth usage data (accumulated charges incurred by users of the device, or charges incurred for the present transaction) in a storage unit associated with the device, the fourth usage data being derived from the transferred third usage data.

In other words, according to the invention, charges, i.e., balance reductions, are not supplied directly from the device (e.g., a telephone set) to the storage unit, but instead are first transferred to the card (as first usage data) in order to reduce the pre-paid credit balance thus remaining on the card and then, i.e., immediately thereafter or some time later, conveyed, as a current balance, from the card to the device (as third usage data) and, after possible processing, stored in the storage unit of the device. As a result, the storage unit stores (fourth) usage data which are related with certainty to the (second) usage data recorded on the card, so that a reliable check of the usage data and thus reliable settling of the call charges is possible. The (fourth) usage data, i.e., current balance, which is stored in the storage unit may, in this case, either be identical to the transmitted (third) usage data and/or derived therefrom. Thus it is possible, for example, for an absolute value, such as a balance recorded on the card, to be transmitted from the card to the device, while in the storage unit a relative value, indicative of usage during a current transaction, such as the difference between the initial balance on the card at the start of the transaction and the current balance on the card at the end of the transaction, is stored.

In one embodiment of the invention, the first and fourth usage data are identical. In other words, the balance reductions (i.e., specific charges) transferred from the device to the card are identical to the charges which are ultimately securely recorded in the card as well as in the secure module. This allows an easy comparison of the first and fourth usage data, thus providing a simple and is quick verification of the usage data.

In another embodiment of the invention, the third usage data are derived from the second usage data through a cryptographic process. In other words, the usage data (balance) transferred from the card to the device is encrypted. Subsequently, the balance may be decrypted to render the fourth usage data identical to the second usage data, or the fourth usage data may be recorded or further transmitted (e.g., to an exchange) in encrypted form, thus providing enhanced security.

It will be understood that using a cryptographic technique, or any other data transformation technique, in the method according to the invention is optional and that the first, the second, the third and the fourth usage data may, in certain implementations, all be identical. Furthermore, the steps of transferring the first usage data from the device to the card and storing the second usage data on the card, the second usage data being derived from the transferred first usage data, may be performed more than once. This causes a reduced number of transfers of third usage data from the card to the device, thus reducing the transmission time involved in performing this method.

Advantageously, the method according to the invention is performed such that the transmission of the third usage data (balance) from the card to the storage unit takes place during a verification procedure through which the authenticity of the card is verified. A substantial advantage of doing so is that, at the same time the card authenticity is being verified, the reliability of the usage data is being checked: if the authenticity of the card cannot be demonstrated, the balance that has just been or is being transmitted is unreliable and may be ignored. It is advantageous, in that case, to record and subsequently process the fact that the balance provided by the card in question is unreliable, so that the card may, for example, be rendered invalid. If the balance is involved in the verification procedure itself, by, for example, an authenticity code being generated on the basis of, inter alia, the balance, a single data transmission from card to device may serve two purposes, viz. the verification of the authenticity and the verification of the balance itself.

Preferably, the verification procedure for each usage (e.g., telephone call or act of purchase) of a device takes place repeatedly. Thus, it is achieved that a transmission of the balance and a check or verification thereof can occur a number of times during the usage in question of the device. Consequently, current data is stored and checked at all times. By repeating the verification process and thus the transmission of the call data more frequently per unit of time, the reliability of the stored data is increased, while the disadvantageous effects of a premature removal of the card, i.e., a removal before usage has finished (e.g., before a call has been completed), are reduced.

The method according to the invention is preferably carried out in such a way that the verification procedure comprises the determination of an authenticity code, which determination takes place on the basis of, inter alia, the current value of the balance. This provides additional security of the usage data.

Advantageously, as noted above, the usage data may comprise a credit balance. In the case of a telephone set, the balance will be a pre-paid call charge credit. It is possible, by means of the method according to the invention, to guarantee that, for example, the amount debited from the card is represented correctly in (the storage unit of) the device.

The costs of a particular transaction, the number of times that a particular card or a particular device is used (the number of transactions) and usage data of this type are advantageously stored by means of at least one counter. When charges, which are deducted from a balance on the card, are stored, the contents of the counter may be increased by the number of units by which the balance of the card is reduced. It is also possible to reduce the contents of the counter by the number of units by which the balance of the card is decreased.

It is possible, for checking the usage data, to always use the difference of two balances or other usage data (counter contents) stored at different times. After reading out a counter or a memory location of the storage unit, the data stored therein can be erased, so that the counter or memory location in question again returns to a start position (e.g., a zero state). Alternatively, to provide security against loss of data if read-out data has been lost, for example owing to a malfunction, it may be advantageous to make use of absolute counters which cannot be reset.

Further security against loss in the case of malfunctions can be obtained if the storage unit, in addition to the current absolute value of a counter, also stores the absolute value of that counter during its most recent read-out. Preferably, the process of reading out from the storage unit, i.e., the transmission of the values (usage data) stored in the storage unit to a downstream system, comprises forming the difference of the values of the counter, i.e., the difference of the current absolute counter value and the absolute value of that counter during the most recent read-out thereof. Thus, it is always possible to read out a relative value, namely the difference between two counter contents, from the storage unit, while the detrimental effect of data loss during read out is considerably reduced. Additional security of the usage data is obtained if the process of reading out (of the stored fourth usage data) from the storage unit comprises forming a cryptogram from usage data so read out. In other words, during data read-out, the stored usage data is converted cryptographically into a code which is subsequently transmitted to a downstream system. This code (cryptogram) need not be decodable. In the downstream system (telephone exchange, central recording system), a similar code can be generated which, for the purpose of verification of the coded usage data, is tested to determine whether it is identical with the received code.

The storage unit, which as discussed in the above may comprise one or more counters, is preferably accommodated in a secure module in the device which is accommodated, preferably detachably, in, e.g., the pay phone in question. The module is preferably designed to be robust so as to prevent manipulations and is provided with a suitable connector to form an electrical and mechanical connection with the device in question. Advantageously, the module also has an enciphering device and a random-number generator located therein for use as part of the verification procedure. This has the advantage that the process of enciphering cannot be externally influenced. Enciphering can be used both in order to transmit the usage data (balances) in a secure manner, for example from the storage unit to a central processing device, and for forming, on the basis of certain data stored in the card, an authenticity code which can be used in the verification procedure. The module may also be constituted by an additional card.

Advantageously, a device, in which the method according to the invention is used, is suitable for inputting security codes for retrieving secure information or inputting secret access numbers. Since many users find it difficult to remember different security codes (such as, e.g., PIN codes, Personal Identification Number codes), a suitable card is advantageously provided with a semiconductor memory for storing security codes, wherein its memory is only accessible by inputting, via a device, a further security code. Thus, it is possible, by inputting only a single security code, to retrieve a number of other codes and, for example, make these other codes visible on a display unit of the device in question. In so doing, use is made of the fact that card-operated devices of the type discussed in the above are generally equipped with a display unit for displaying amounts to be paid, instructions for the user, numbers dialled (in the case of telephone sets), and so forth. In combination with a suitable card which may, for example but not necessarily, be a card for making payments, the reproduction of secret or other stored data such as security codes (e.g., PIN codes) is possible. The data thus reproduced may, for example, in turn be applied, as input, to the device in question for a further action (e.g., dialling a secret telephone number, obtaining a certain access privilege or inquiring for a balance of a particular bank account). Advantageously, a card of this type can be used for retrieving usage data from secure storage units of a wide variety of card-operated devices.

BRIEF DESCRIPTION OF THE DRAWINGS

The invention will further be explained below with reference to the drawings, in which:

FIG. 3 shows the proper alignment of the drawing sheets for FIGS. 3A–3G;

FIGS. 3A–G collectively show, by way of example, a detailed data exchange as well as an operational flowchart for communication occurring among the electronic payment card 1, the card-operated device 2, specifically a pay phone, and the secure module 3, located within the pay phone, and the relevant processing occurring therein—all in accordance with the present invention and for the illustrative apparatus depicted in FIG. 2.

For ease of understanding, identical reference numerals have been used to denote similar elements common to the figures.

DETAILED DESCRIPTION OF A PREFERRED EMBODIMENT

Figure 1:
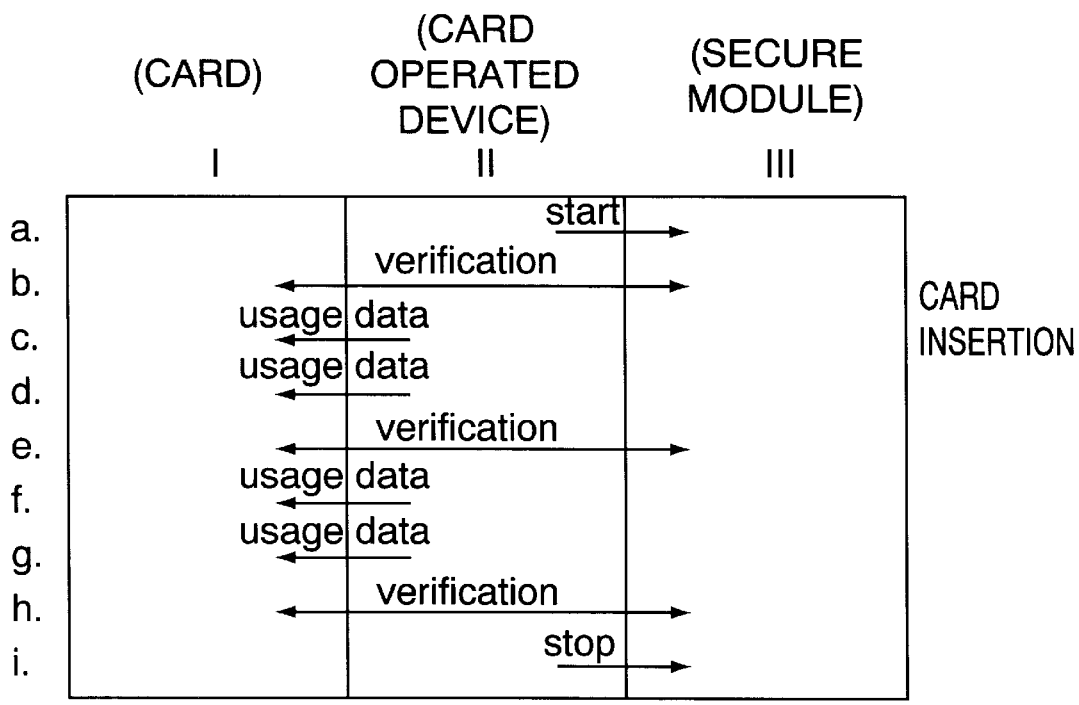
FIG. 1 shows schematically, by way of example, a high-level data exchange that occurs among an electronic payment card, a card-operated device and a secure module of the card-operated device, all in accordance with the present invention.

The procedure depicted schematically in FIG. 1 comprises a possible high-level data exchange, according to the invention, between a device (e.g., a public pay telephone set—"pay phone", or a vending machine) and an electronic payment card for a single transaction, such as a telephone call. The device is provided with an internal secure module for storing data. Columns I, II, and III represent the card, the card-operated device and the secure module (including an internal storage unit), respectively. From top to bottom, the successive times a to i inclusive are shown. At these points in time, the following high-level operations occur, respectively:

a. The card has been inserted into the device. Thereupon, the device outputs a start instruction (start pulse) to the module.

b. Between the card and the module and through the device, a verification procedure takes place to check of the authenticity of the card. This procedure involves the transmission of, inter alia, usage data, (here, e.g., a current value of a stored balance—a "starting" balance) from the card (I) to the device (II). The module (III) stores the current values (usage data) for this card.

c. During usage (e.g., during a telephone call or purchase transaction), a card balance is reduced (debit charges) and usage data (such as cost indicating data) are transmitted from the device (II) to the card (I).

d. Same as in c.

e. The verification procedure is repeated for the purpose of checking whether (1) the card is still present; (2) that card is authentic; and (3) that card is identical to the card present at time b. The secure module calculates the difference between the current value(s) of the counters storing usage data and that (those) stored at time b and appropriately increments an internal counter. If one of the points (1) to (3) inclusive is not complied with, the transaction is discontinued; otherwise, the transaction is allowed to progress.

f. Same as in c.

g. Same as in c.

h. Same as in e.

i. The transaction is completed, whereupon the device outputs a stop instruction (stop pulse) to the module. The latter may, if appropriate, update the stored data (counter contents).

It will be clear from the above that the reliability of the data stored in the secure module increases as the verification procedure is performed more frequently during a single transaction. However, given the time required to complete the verification procedure, in general, this procedure will not take place after each successive adjusting (e.g., reduction) of a card balance (as for c, d, f and g above) during a single transaction. It should be noted that during the verification procedure, in addition to the usage data, other data, such as card identification data, may likewise be transmitted from the card to the device. This will be further explained below.

Inasmuch as the present invention is particularly, though not exclusively, suited for use with pay phones, FIGS. 3A–3G collectively show, by way of example, a detailed data exchange for communication occurring among as well as a flowchart of operations executing within card 1, card-operated device 2 which here is illustratively a pay phone, and secure module 3 located within the pay phone—the operations within the card and secure module being implemented either in dedicated hardware and/or software residing within respective memories in these components. To simplify understanding, this figure is organized with the same three columns, I, II and III, as in FIG. 1, which correspondingly represent three components of the entire pay phone apparatus: i.e., the card, the card-operated pay phone itself and the secure module located therein. The specific operations shown in FIGS. 3A–3G which correspond to and constitute each high-level operation depicted in FIG. 1 are collectively labeled with the corresponding letter "a" through "i" as depicted in the latter figure. In addition, the lines transiting among these columns represent corresponding communication, i.e., messages, occurring among these three components. To enhance understanding, the is reader should also simultaneously refer to FIG. 1 throughout the following discussion.

Operationally speaking, whenever card 1 is inserted, as represented by line 101, into the pay phone, the pay phone generates, through operation a and as represented by line 103, a start instruction to the secure module. The secure module, in turn, detects, through execution of block 105, whether card 1 is properly inserted into the pay phone. If the card is not so detected, then, it is likely mis-inserted. In that case, block 105 will invoke an appropriate error routine (not specifically shown) to, e.g., prompt the user to re-insert the card. Alternatively, if the card is detected, then block 105 routes execution to perform first verification procedure 110 (also denoted as operation b) and specifically to block 111 therein.

As discussed above, verification procedure 110, being executed at this time, initially verifies the authenticity of the card and obtains a value of the current balance (here the "starting" balance) stored therein. In particular, block 111 generates a first random number, $N_1$. This block then produces an authentication request, $R_1$, which includes random number $N_1$ and thereafter sends, as symbolized by line 113, this request to the card. The random number is used to uniquely identify a response, i.e., an authentication code, sent by the card to this request. In that regard, when the card receives this request, block 120 executes to read the current balance available to the caller and then stored on the card. Once this occurs, block 125 executes to form a message authentication code (MAC), $C_1$, as a pre-defined function of the first random number, $N_1$, a card key, and card data which includes a card identification (ID) number and a value of the current card balance—the key and card data being stored on the card. For security purposes, a conventional "one-way" function is used to present the random number from being subsequently recovered from the MAC. This code and associated card data are then sent, as symbolized by line 128 and through the remaining execution of block 125, back to the secure module. To prevent illicit manipulation, i.e., access, of the pay phone, block 125 executes a pre-defined cryptographic process to encrypt this code and the associated card data on which the code is based. Upon receipt by the secure module, block 130 executes in the secure module to decrypt the card ID and card data (if encrypted) and verify the card. For the sake of simplicity, verification occurs by regenerating the message authentication code using card identification (ID) and card data just obtained from the card, and the first random number, $N_1$, generated by block 111 and accessed as symbolized by dashed line 115, and then comparing the MAC sent by the card to that having been regenerated. If the two MACs identically match, then the card is valid. During verification, block 130 utilizes the card ID (as discussed below) to generate an encryption key for that card, and uses that key during subsequent verification operations performed while the card remains inserted in the pay phone. If the card is invalid, i.e., the MAC provided by the card is not verified, then block 133 executes to terminate the current telephone call. This operation can involve a simple disconnect. If, however, the code is verified, then block 136 derives the current card balance from the code. Once derived, this balance is then stored, through execution of block 140, for subsequent use.

With a verified code, a call is permitted to continue as symbolized by block 135. During the call, one or more metering pulses are sent to the phone, over the telephone network to which pay phone 2 is connected, or are internally generated by the pay phone itself. Each metering pulse represents a finite charge to be incurred by the caller and debited from the card. After typically several, here, illustratively two, metering pulses have occurred verification is repeated and so forth for the remaining duration of the call. Inasmuch as the operations associated with each metering pulse, here illustratively operations c, d, f and g are all identical, only operation c will be discussed in detail. Likewise, since the interspersed verification procedure, e.g., operations e and h are also identical, only operation e will be addressed in detail.

In particular and in response to the receipt of a first metering pulse, operation c occurs to process that pulse by reducing the balance stored on the card and then transmitting an updated reduced balance back to the phone. Specifically, upon the occurrence of the metering pulse, block 150, executing within the phone, generates a decrease code and, as symbolized by line 151, sends that code to the card. This decrease code instructs the card to reduce the current balance stored therein either by a given amount (i.e., here "first payment data") supplied with the code (such as, e.g., the price of an item being purchased), which could occur where a payment card similar to card 1 is used to purchase separate items of potentially differing amounts, or by a predefined fixed amount, i.e., a fixed unit, as in the case for a telephone call. In any event, once the decrease code is received by the card, then block 152 executes therein to decrease the balance then stored in the card by the amount specified in conjunction with the decrease code, i.e., either the amount sent with the decrease code or the predefined fixed amount, to yield an updated, though now reduced, balance (i.e., here "stored second payment data") which is then stored back into the card as the balance. As illustratively shown, two successive metering pulses can occur during either a combined transaction involving the purchase of several items (combined purchase transaction) or a single telephone call. At the occurrence of the second metering pulse, operation d is executed to process that second pulse. This operation contains blocks 154 and 156 (which are identical to blocks 150 and 152) with communication therebetween symbolized by line 155. Although, illustratively two metering pulses occur prior to a next successive verification procedure, an interval (i.e., an "authentication" interval) between successive verification procedures can be set, as discussed below, to accommodate processing a greater or lesser number of metering pulses than just two. As can be appreciated, each such pulse will cause an operation identical to, e.g., operation c to execute to process that pulse.

Also, during the course of an on-going call (or a combined purchase transaction) and, as noted above, in addition to the balance reductions effected through operations c and d, as well as subsequent operations f and g, a verification procedure, such as operations e and h, respectively, is also performed between the card and the secure module. The purpose of each such procedure, also denoted as procedures 160 and 210, is to continually assure that the same card is in use as that which was initially inserted into the pay phone, i.e., that the specific card then in use is in fact authentic. To implement procedure 160, execution proceeds to block 162. This block, when executed, generates a new (here second) random number, $N_2$, unique from all other random number (s) previously generated during the current call. Once this number is generated, execution proceeds to block 165 which, like block 111, forms an authentication request, here second authentication request $R_2$. This request, in a similar fashion as request $R_1$, includes the second random number, $N_2$. This second request is sent, as symbolized by line 168, to the card which, through execution of block 170, generates a message authentication code, in the same identical fashion as did block 125. This code is an encrypted function of the second random number, $N_2$, the card key, and the card data including the current balance then stored in the card. The resulting authentication code, $C_2$, and card data are then sent back, as symbolized by line 172, to block 175 for decryption and verification. Verification occurs through execution of block 175, in the same fashion as occurred through block 130, by regenerating a message authentication code, and determining whether that regenerated code matches the code just received from the card. The code is regenerated on the basis of card data, the card ID and the second random number, $N_2$, generated by block 160 and accessed as symbolized by dashed line 164. If the card is invalid and/or these two random numbers do not match, i.e., the code is not verified, then block 178 executes to terminate the current telephone call. As with block 138, this operation can involve a simple disconnect. If, however, the authentication code is verified, then block 180 derives the current card balance (i.e., here "third payment data") from message authentication code $C_2$. Once derived, this current balance is used to update the usage counter in the pay phone. In particular, block 180 calculates the total amount, T, that has been deducted from the card for the present call (or common purchase transaction). This amount is simply the starting balance on the card, as symbolically accessed over dashed line 142 and originally produced by block 140, less the current balance. Thereafter, an internal usage counter in the pay phone, is updated. This counter totalizes all the charges, U, made through this pay phone and is updated to reflect the current usage, i.e., by increasing the contents, U, of the counter by the amount T, and storing the result back into this counter (as "fourth payment data"). Furthermore, if the authentication code is verified, the call is once again permitted to continue, as symbolized by block 179.

Execution then proceeds to decision block 182 to determine if the call is completed and has been fully serviced. In that regard, as soon as a call is completed, pay phone 2 generates a "stop" signal, as symbolized by line 181. If this signal has not occurred, i.e., the call is still in progress, then decision block 182 routes execution, via NO path 185, to block 187. This latter block waits for the start of the next authentication interval. Authentication intervals can be set to occur quite frequently, i.e., at relatively short predefined intervals, though doing so will increase the processing load required in both the card and the device. Short authentication intervals may be useful to combat phone fraud in those commercial locations where illicit tampering with pay phones is likely to occur. Also, where the authentication interval is the same as and temporally co-extensive with an interval for successive metering pulses (and hence decrease codes), this interval can be set relatively short so as to decrease a minimum amount of time (i.e., a minimum billing interval) for which the caller will be charged. During the remainder of the present authentication interval, two metering pulses successively occur and are processed through operations f and g (each of which is identical to operation c) which contain blocks 190 and 192, and 194 and 196 with communication therebetween symbolized by lines 191 and 195, respectively. Once this processing is complete and at the start of the next authentication interval, execution proceeds to verification procedure 210 to perform the next verification procedure, i.e., operation h, for use during the next authentication operation, and so forth. This procedure, containing blocks 212, 215, 220, 225, 228, 229 and 240, and communication between blocks 215 and 220, and 220 and 225, as symbolized by lines 218 and 222, operates in an identical fashion as does procedure 160 to generate a third authentication request, $R_3$, with a third random number, $N_3$, to the card and receive, from the card, a third authentication code $C_3$ and the card data—the latter containing the card balance then stored in the card, and to update the usage counter to reflect immediately prior card usage. Depending upon the length of the call and relative to the verification interval, a series of separate successive verification procedures, as illustrated and described above, can occur. As a result of multiple verification procedures (here operations b, c and h) the balance then stored in card 1 is repeatedly transferred (copied) to pay phone 2 during the transaction and the balance stored in the secure module is repeatedly updated to reflect immediately prior usage.

At the completion of verification procedure 210, execution proceeds to decision block 250 to detect the presence of the stop signal, again symbolized by line 181. With the signal occurring as depicted by label i, execution transfers, via YES path 252, to block 270. Block 270 executes to erase any temporary usage values that may have been stored for the current call, within the secure module. At this point, processing of the charges for this call is complete and hence execution exits. Alternatively, if the stop signal did not occur, then the call has not been completed. Consequently, decision block 250 routes execution, via NO path 254, to block 255 which waits for the start of the next authentication interval and so forth with execution looping back, via path 259, to decision block 250 after each successive verification procedure.

Though each verification procedure has been described as generating a corresponding random number, then forming an authentication request based on that random number and sending that request to the card, clearly various modifications can be made to this procedure. For example, instead of sending an authentication request to the card, the secure module can send a corresponding random number. In response to the latter, the card can generate its card data and an authentication code, encrypt this information and then send encrypted information back to the card-operated device and secure module therein. Alternatively, a four-step verification procedure for so-called "synchronous" cards can be used. This particular procedure entails first sending a read command from the secure module, via the phone, to the card to obtain information from the card. Second, once the card receives this command, the card returns card data, including the current balance stored therein, to the device. Third, the secure module generates a random number and sends this number to the card. Fourth and last, upon receipt of this random number, the card generates a corresponding message authentication code as described above, and returns this code to the device and secure module. The secure module will not accept the card data returned in the second step unless the authentication code subsequently returned in the fourth step is correct for the card in use. Furthermore, so-called "asynchronous" cards can be implemented to always present their data upon insertion without any prompting, such as in receipt of an authentication request or read command. Moreover, though verification preferably utilizes random numbers as described above, a variety of other well known techniques that utilize other unique information to verify the authenticity of the card then in use can be used instead.

In a pay phone (and many vending applications), as contrasted with many other smart card payment systems, such as electronic check systems, the former utilizes pre-paid cards, i.e., a caller purchases a card by remitting full payment to a telephone company (or other vendor) and a card with predefined balance is then provided for the caller to then use later. Given the pre-paid nature of these cards, there is simply no need to store proof of payment, within the device and/or the card, for each and every transaction made through the card. This, in turn, drastically and advantageously reduces the memory requirements in the secure module to one counter (or a small number thereof) for accumulating all the usage data. Here, the usage counter in the pay phone is used to monitor how much that phone is being used (i.e., through, e.g., the total usage and rate of usage), rather than recording each and every separate transaction made therethrough. Also, the total usage as reflected in this counter, when summed across all such counters in all pay card phones, should correspond, to a certain extent and with a lag factor, with the total monetary value of all pay phone cards then having been sold.

Advantageously, by repeated transfers of balance information from the card, such as at a minimum at the beginning and at end of a phone call or transaction, i.e., before any reduction has been made to the balance and after all such reductions have occurred, the present invention establishes by virtue of these transfers to the secure module that, in fact, the balance stored within the card has been correctly and fully debited. Moreover, since payment has already been remitted, in advance, to the telephone company to reflect the totalized charges (usage data) maintained in the counter in any pay phone, then once a phone card has been correctly debited during a call as taught by the present invention, then any subsequent illicit tampering of the pay phone would only affect the totalized charge (usage data) stored in the counter but advantageously will not result in any actual revenue loss to, e.g., the telephone company that issued the card.

Furthermore, although the usage counter has been described, through execution of block 275, as being updated once at the end of each transaction with the total amount deducted from the card during the transaction, this counter can alternatively be updated at the conclusion of the second and every subsequent verification procedure to reflect the immediately preceding usage. Moreover, through the use of two absolute counters, usage can be accurately totalized even if a verification procedure fails to properly operate. In particular, the secure module would contain two absolute (non-resettable) counters, e.g., $Ctr_1$ and $Ctr_2$. Counter $Ctr_1$ would store the totalized usage, e.g., for the pay phone. The initial balance stored in the card at the beginning of the transaction and determined as a result of the first verification procedure, e.g., operation b as shown in FIG. 1 or FIGS. 3A–3G, would be stored in the second counter, $Ctr_2$. At the conclusion of the second verification procedure, e.g., operation e, the secure module would determine the immediately preceding card usage by subtracting the most recent card balance (obtained during this second verification procedure) from the contents of the second counter. This card usage would then be added to the contents of the first counter with a resultant sum stored back into the first counter. Thereafter, the most recent card balance would be stored into the second counter. For the third verification procedure, e.g., operation h, and every subsequent such procedure occurring during the current call, the counter operations that occurred during the second verification procedure would simply be repeated. In this manner, the first counter in the secure module is cumulatively updated with the difference between the most recent card balance and that immediately prior thereto. This processing is summarized in Table 1 below.

TABLE 1

| Verification Operation | Counter Operation |
| --- | --- |
| c | $Ctr_1 \leftarrow U$ |
|  | $Ctr_2 \leftarrow$ Initial Card balance |
| e | $Ctr_1 \leftarrow Ctr_1 + (Ctr_2 -$ Most Recent Card Balance) |
|  | $Ctr_2 \leftarrow$ Most Recent Card Balance |
| h | $Ctr_1 \leftarrow Ctr_1 + (Ctr_2 -$ Most Recent Card Balance) |
|  | $Ctr_2 \leftarrow$ Most Recent Card Balance |

Advantageously, if one of the intermediate verification procedures, such as operation e, fails to execute properly and add the immediately preceding card usage into the total usage, this totalization will still be correctly performed during the next verification interval. This occurs by virtue of the second counter having then been updated to the then current card balance which by then has been decreased to reflect usage during the immediately prior two authentication intervals. Therefore, a loss of data during any such intermediate verification interval will not adversely affect the totalized usage. Moreover, since the counters are absolute, then any data loss occurring during read-out from either counter can be easily eliminated by simply reading the contents of that counter again. The increased accuracy in totalized usage data provided by this alternate updating scheme will lead to increasingly accurate and fair settlement of call charges with site owners who receive a portion of the call revenue of a pay phone (or vending machine).

Figure 2:
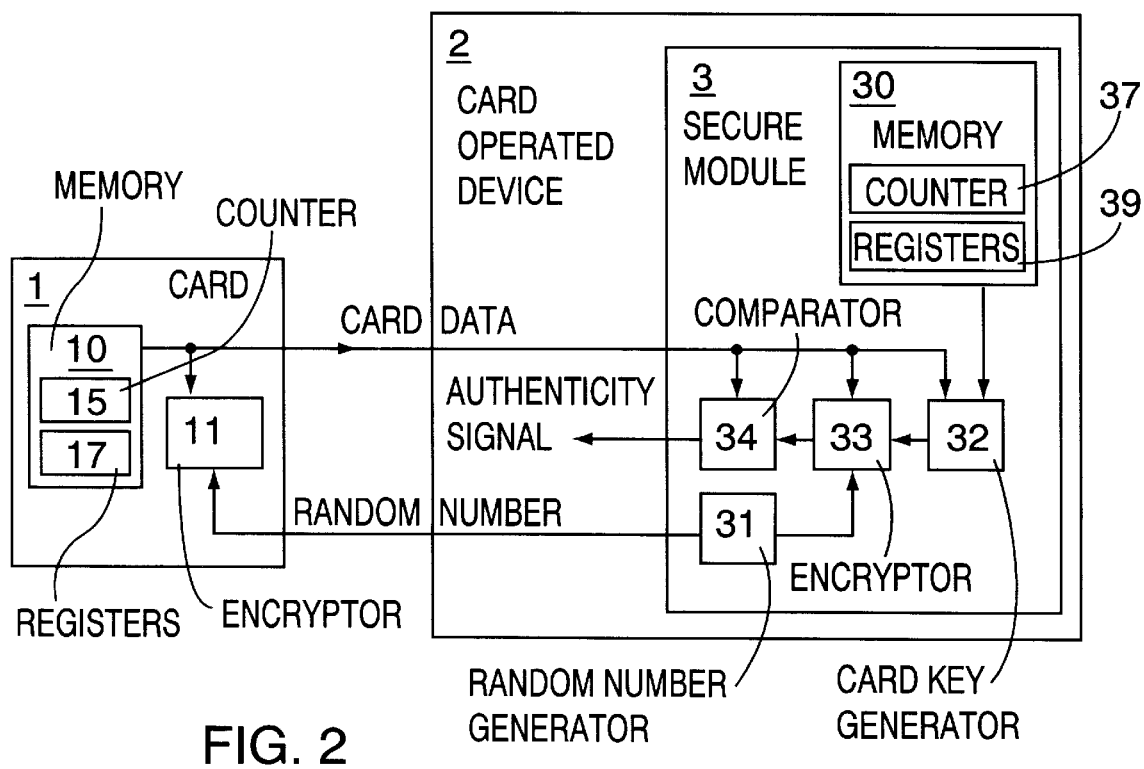
FIG. 2 shows schematically, by way of example, an illustrative embodiment of a system in which the present invention has been implemented.
Figure 3A:
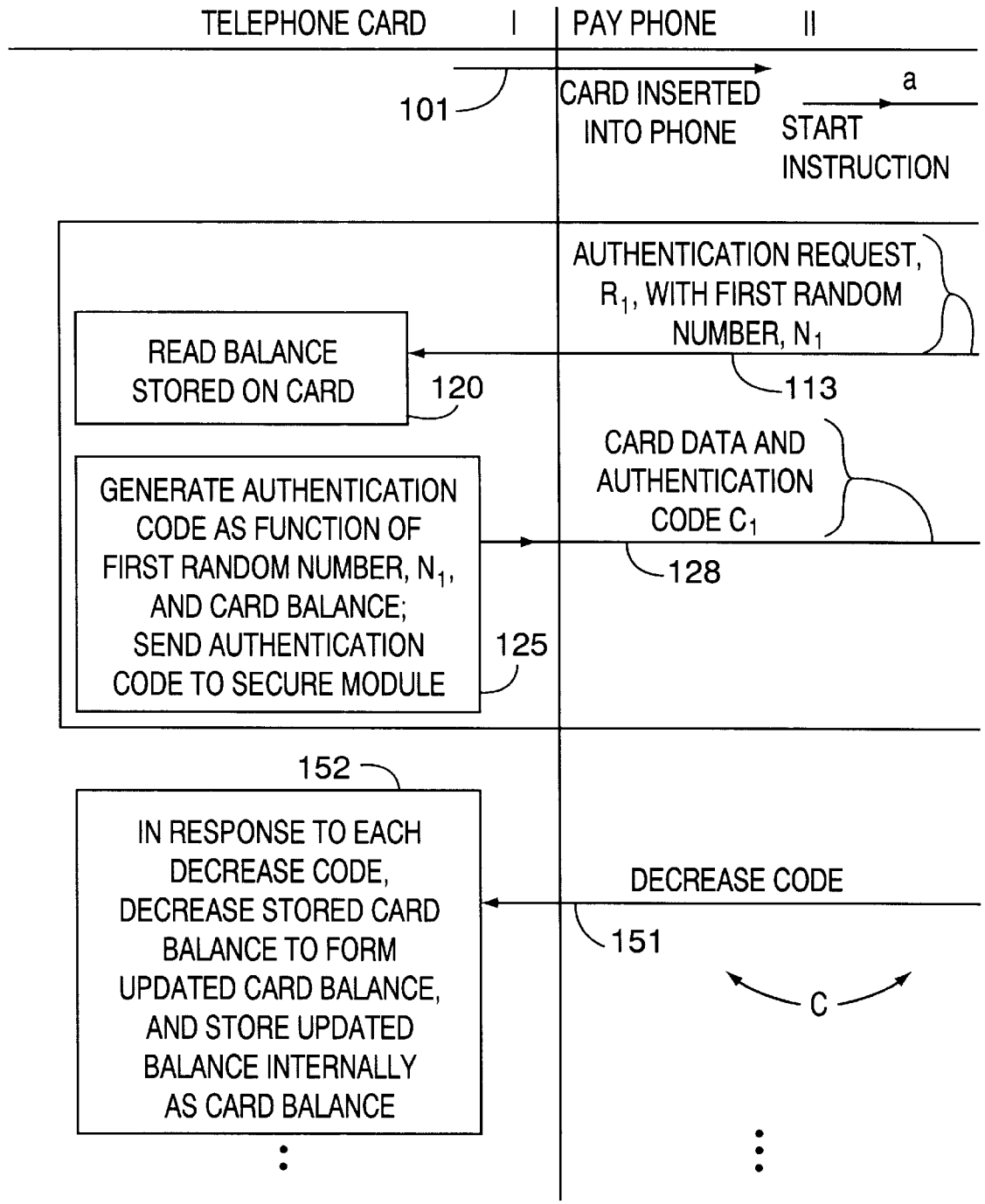
Figure 3C:
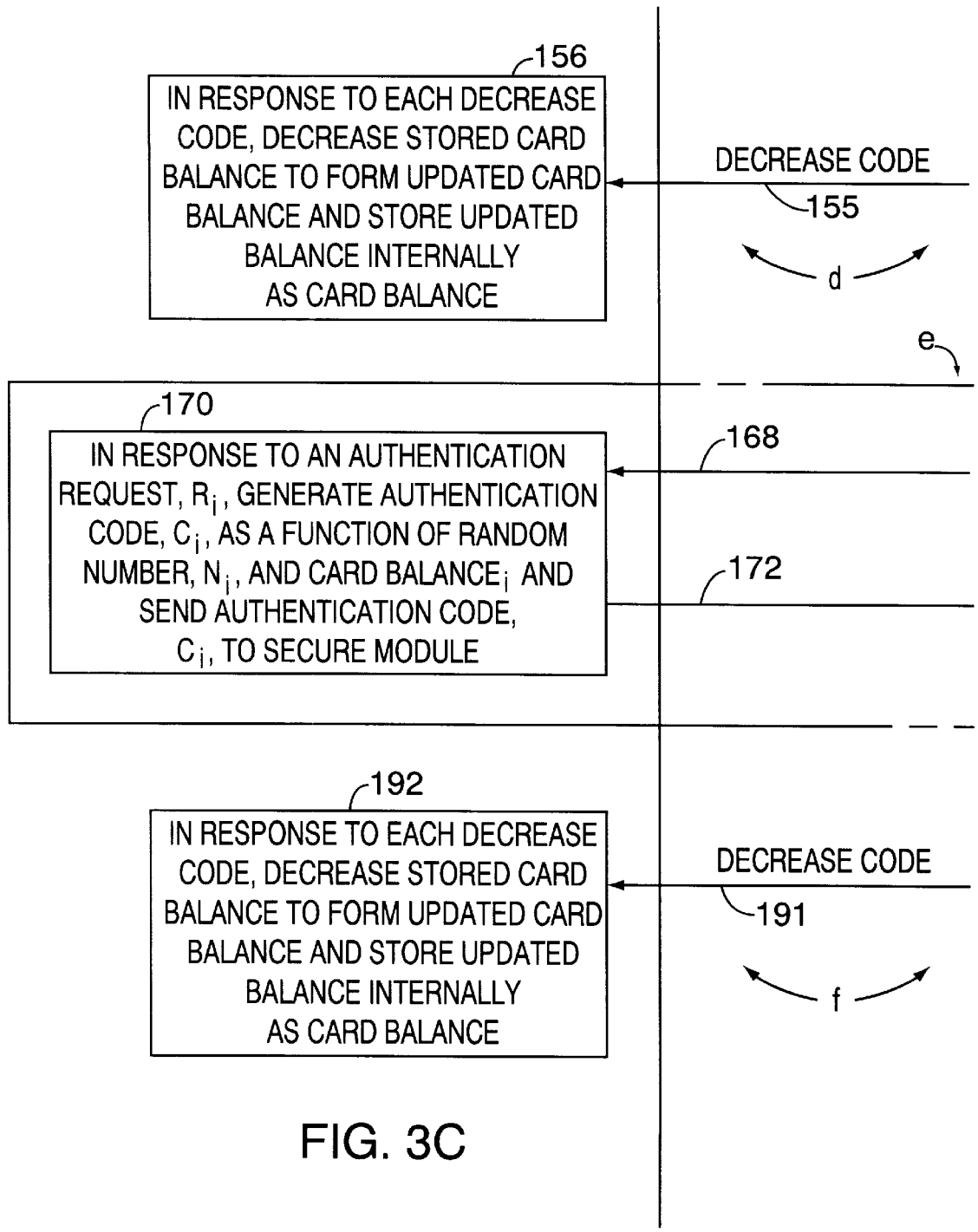
Figure 3E:
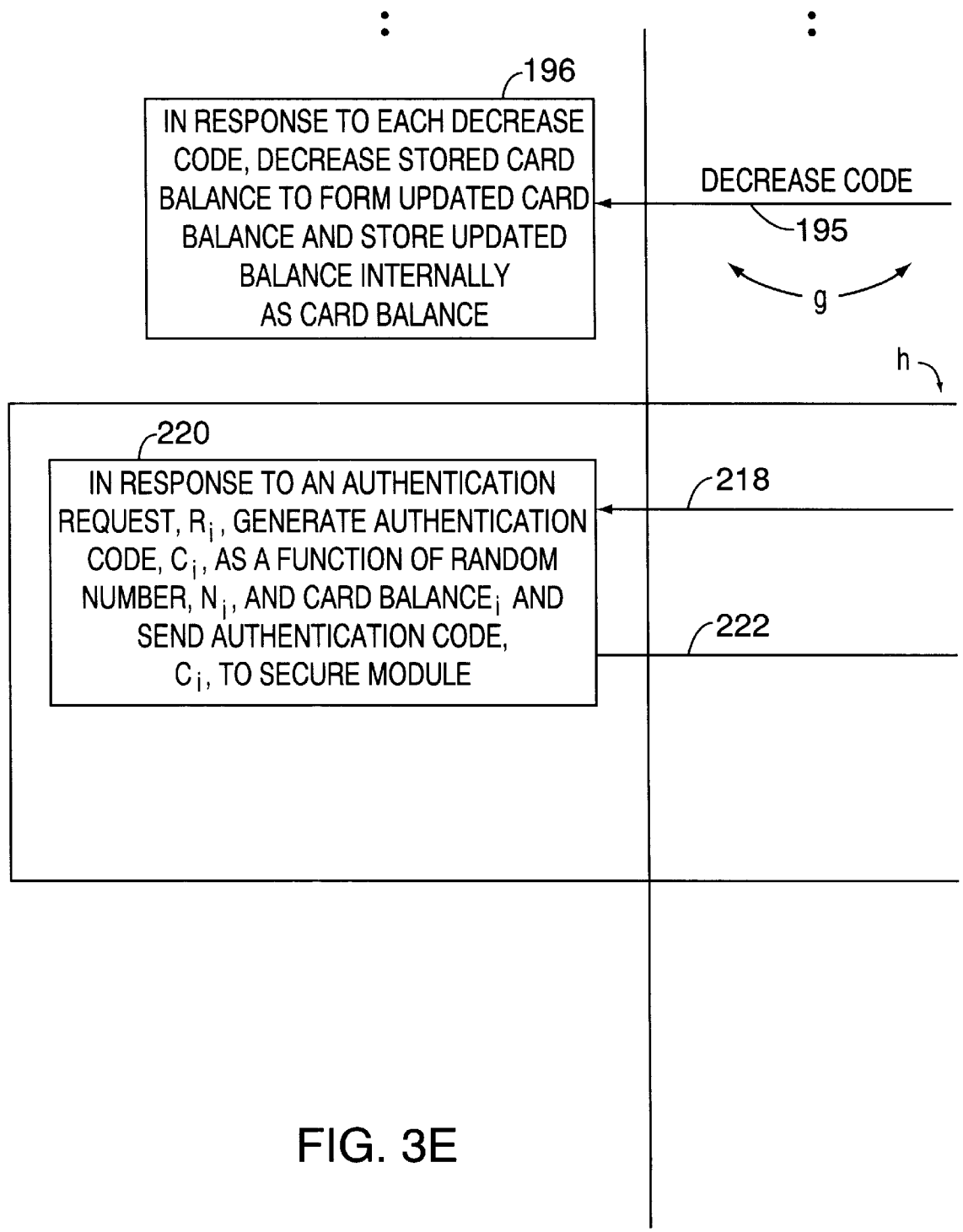
Figure 3F:
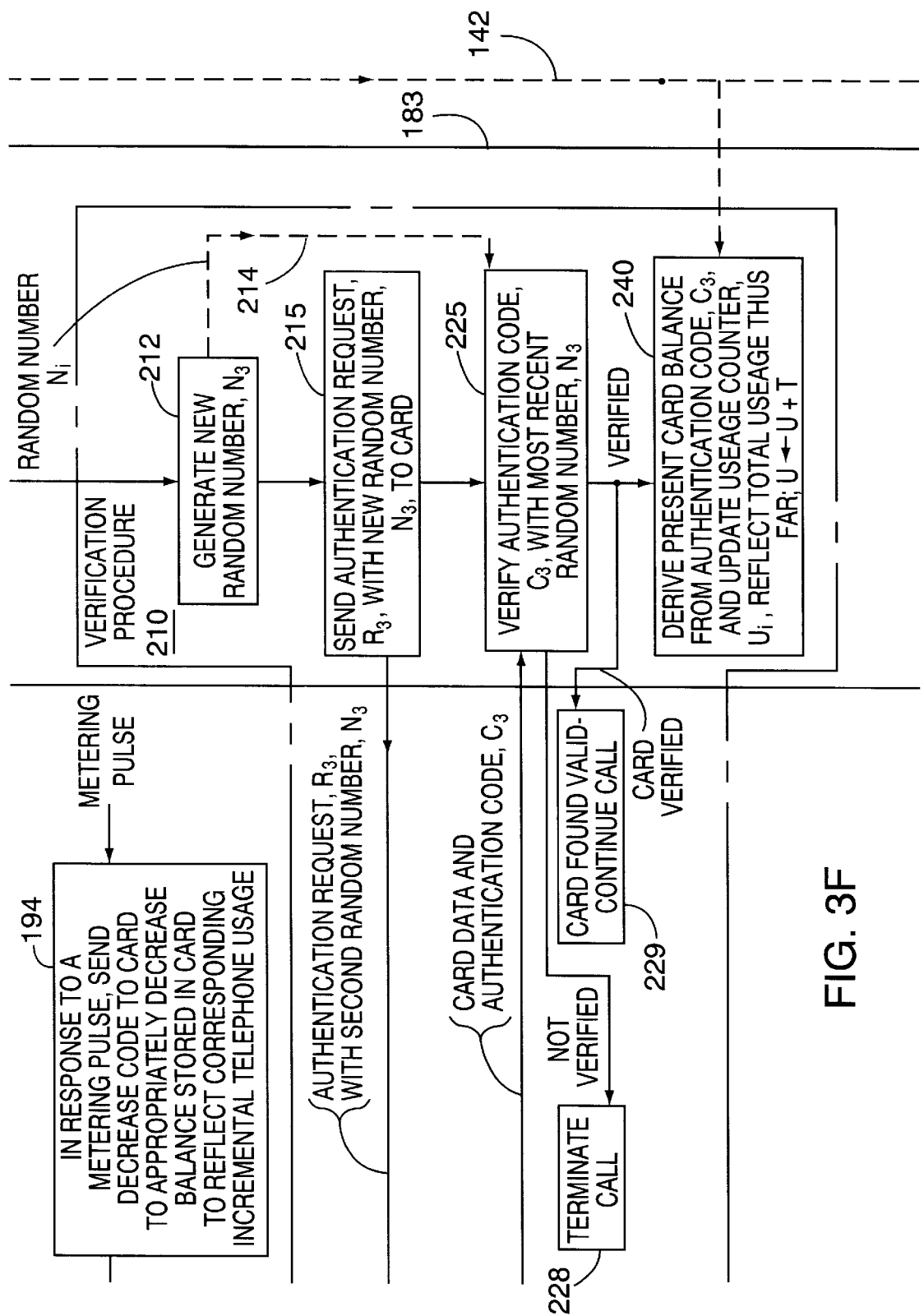
Figure 3G:
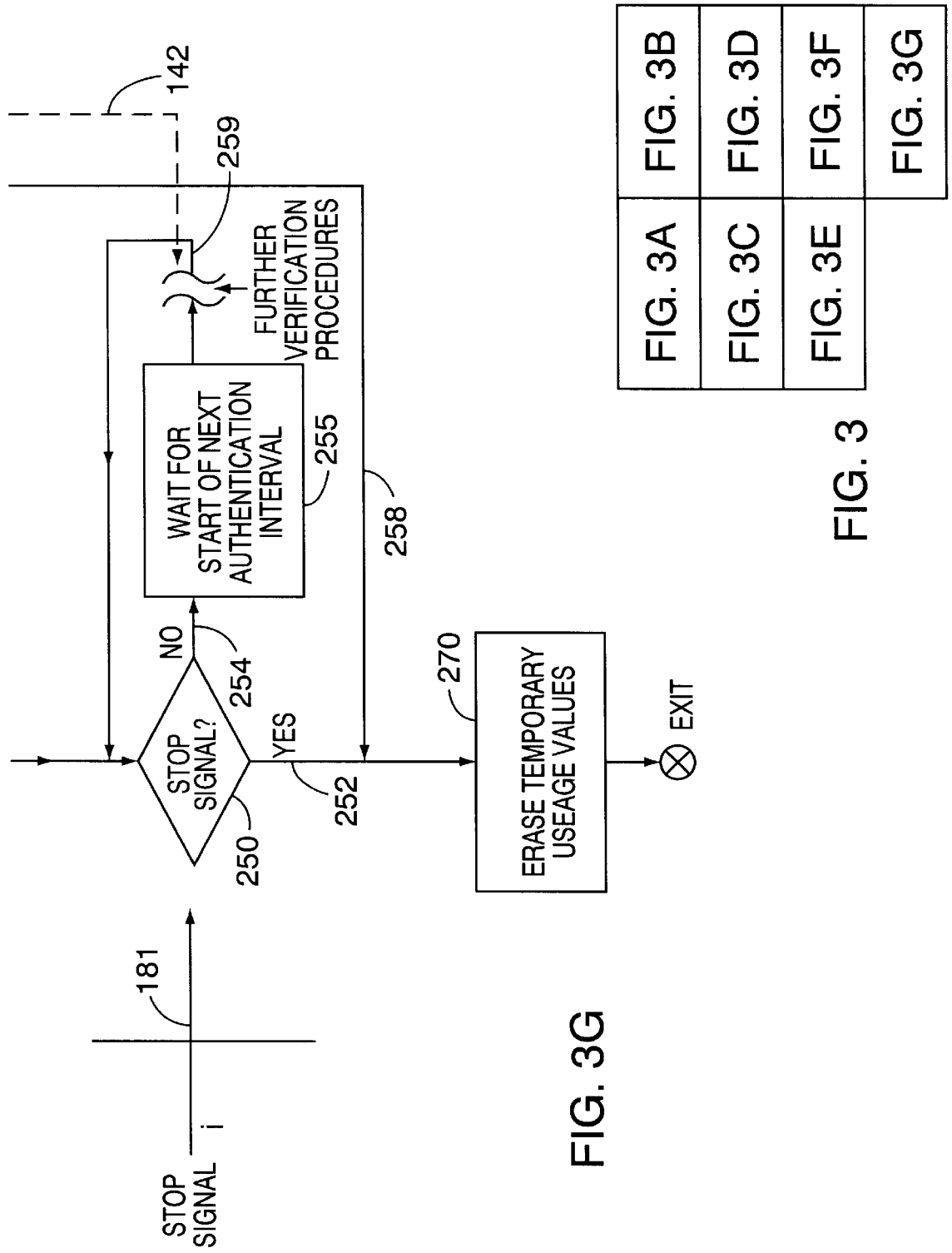

The card 1, shown schematically in FIG. 2 and as preferably implemented as a "dumb" card, comprises, at a high level, a memory 10 for storing data, which includes usage data (such as the card balance) and encryptor 11. The memory 10 may be constituted by, e.g., a magnetic strip but is preferably a semiconductor memory. Device 2, depicted schematically at a high level in this figure, is provided with a secure module 3 in which a storage unit (memory) 30 is disposed. Stored in the memory 10 are, in addition to a card counter 15 (in particular, a count value therein), a card identification (card ID) and a card key—the latter two being stored in registers 17 (all of which are implemented as corresponding memory locations within memory 10). The card key, the card counter and the card identification are fed to an encryptor 11 which is also fed, from the device 2, with a random number. From this data, the encryptor 11 supplies an authenticity code which, like the card identification and the card counter, is transmitted to the device 2 and thence to the module 3. In the module 3, the card identification and a passkey (generic key) read out from registers 39 are fed to card key generator 32 which generates the card key therefrom. Within memory 30, data for the card identification and the passkey are stored within registers 39. Counter 37 stores usage data. Counter 37 and register 39 are illustratively implemented as corresponding memory locations within memory 30. Generator 32 may comprise suitable logic gates or a suitably programmed processor.

The card key generated by generator 32 is fed, like the card identification, the card counter and the random number mentioned earlier, which was generated by random number generator 31, to an encryptor 33. Encryptor 33, in a manner corresponding to that of the encryptor 11 of the card 1, generates an authenticity code. This code, like the code generated by the encryptor 11, is fed to a comparator 34. If the two authenticity codes, i.e., the code generated by the card 1 and the code regenerated by the module 3, match, the card in question is judged to be authentic and a corresponding signal is output by the comparator 34 to the device 2, so that the transaction (use of the device with the aid of the card in question) may be continued. Both the card 1 and device 2, as shown in FIG. 2, contain appropriate conventional logic, such as inter-connection and clocking circuitry, and input/output (I/O) port(s)—all of which is not explicitly shown.

The verification procedure described here and the components required therefor serve only as an example. It is understood that implementation of the invention can also be achieved by an alternative verification procedure involving transmission of usage data from the card to the device.

Furthermore, though the card ID, as discussed above, is used to generate the proper card key for use during a verification procedure, the same key could be used for all cards. However, to provide increased security, a master key and the card ID are used to derive a key that is specific to a particular card or group of cards. This derivation is accomplished through, e.g., a table or by processing the master key and card ID through an appropriate cryptographic function. This, in turn, necessitates, as in the case above, that the card ID is transferred during verification, from the card to the secure module.

Figure 4:
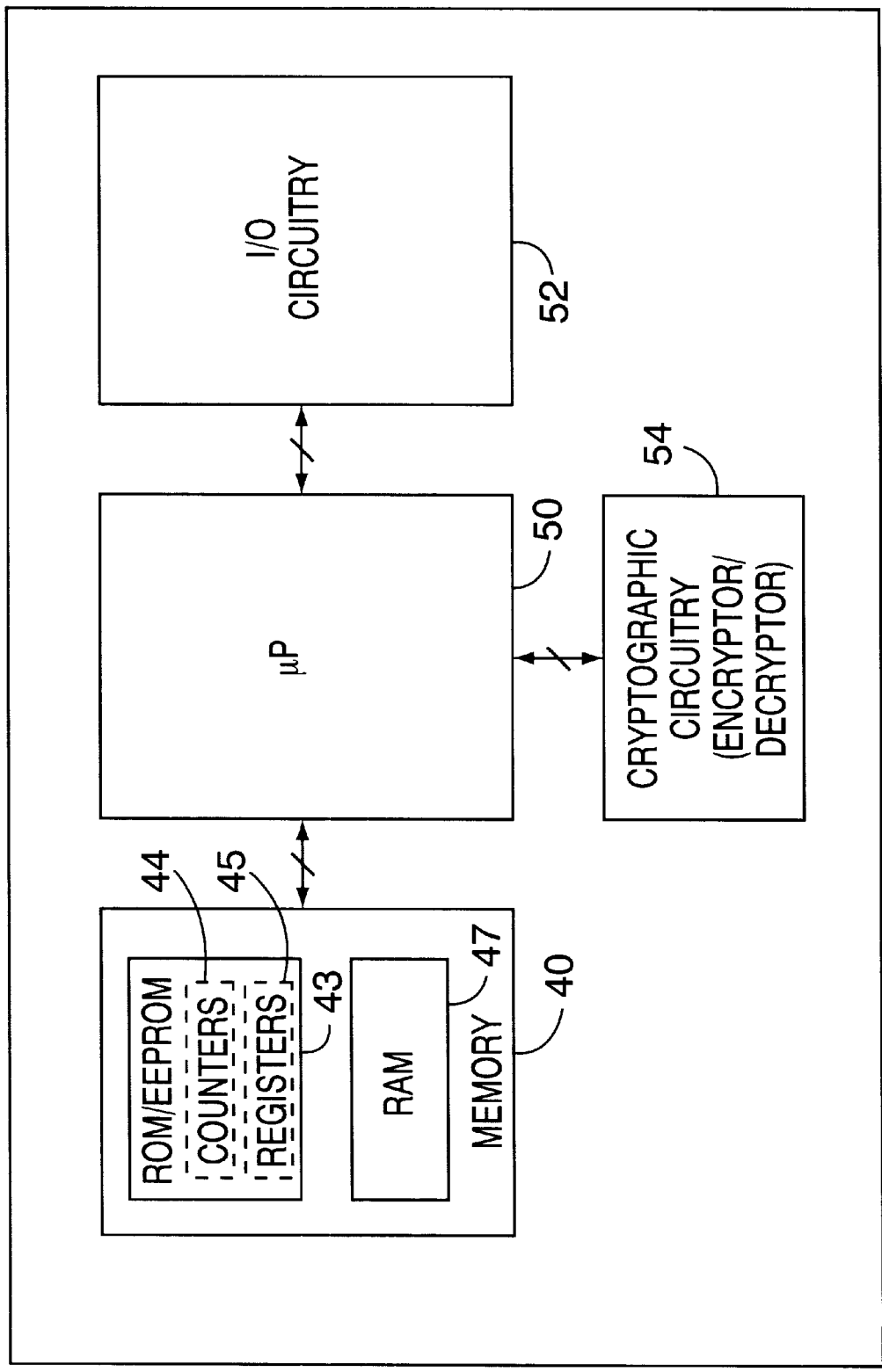
FIG. 4 shows an alternate embodiment, specifically system 60, that can be used to implement either card 1 or secure module 3 depicted in FIG. 1.

The device 2 and the module 3 shown schematically in FIG. 2, comprising suitable means for carrying out the invention, may be assembled from commercially available components. Techniques for implementing electronic circuits are described, inter alia, in P. Horowitz and W. Hill, *The Art of Electronics* (©1989: Cambridge), which is incorporated by reference herein. Suitable cryptographic techniques may be found in H. Baker and F. Piper, *Cipher Systems* (©1982: London), which is also incorporated by reference herein. As shown in FIG. 4, the card 1 may, e.g., be a suitably programmed commercially available "smart" card (i.e., a card which contains a microprocessor as contrasted with a "dumb" card that does not) that has an architecture broadly shown as system 60. Here, the card advantageously and illustratively comprises a microprocessor 50 for processing data; memory 40 having a random access memory (RAM) 47 for temporarily storing data, such as usage data; a read-only-memory (ROM) 43 which may be implemented and/or supplemented by an erasable or electrically alterable read-only-memory (EPROM or EEPROM) for storing program instructions and other permanent and semi-permanent data, such as a card key, a card identification code (ID) in registers 45 and counter values within counters 44—all of which are implemented as suitable storage locations within ROM 43; input-output (I/O) circuitry 52 for receiving and transmitting data; and, optionally, cryptographic circuitry (54) for performing cryptographic operations, e.g., encryption and decryption. Memory 40, cryptographic circuitry 54 and I/O circuitry 52 are all interconnected, via suitable bi-directional links, to microprocessor 50. The links may be separate, as shown, or a common bus. The components of the card 1 may advantageously be integrated in an application specific integrated circuit (ASIC). Though the present invention can be used with "smart" cards, the rather simple processing incident to the invention permits the invention to be particularly useful with "dumb" cards which, due to inter alia, their lower cost of fabrication, are often preferred over "smart" cards for use with card-operated devices, such as pay phones. At least some of the electronic components of the module 3 may also be accommodated in an ASIC.

It will further be understood that the device 2, in addition to the parts shown, comprises further parts (not shown) which provide for suitable functioning of this device. Thus, the device 2 will comprise a card reader device which is preferably incorporated therein and into which the card 1 can be inserted and by means of which it is subsequently possible to communicate with the card. The device 2 is further provided with suitable means for performing a transaction, for example, communication means for making a telephone call, dispensing means for dispensing a purchased product and the like. For the purpose of implementing the invention, a suitable device, which is embodied by the device 2, is at least provided with means for storing usage data, means for transmitting usage data from the card to the device, and means for deriving, from the transmitted usage data, the data which have to be stored. This derivation may comprise both an arithmetic operation, for example addition or subtraction, and copying of the usage data or, on the basis of said usage data, incrementing or decrementing counter contents. Data stored in the storage unit may, for example, be read out via a cable link, but also by means of a suitable card which is provided with means for secure data storage. Security of this type is advantageously achieved by means of a security code for obtaining access to the memory of the card. Although secure module 3 has been shown as implemented with dedicated circuitry, this circuitry could alternatively be a computer based system 60, as broadly shown in FIG. 4, with a very similar or even identical architecture to that used for card 1 and described above. In this case, each of the operations provided by the secure module would be implemented through corresponding software stored within the memory located within this system.

As has been explained above, the invention provides the possibility of storing, in the storage unit of the device, a counter value (e.g., balance value) which has been derived from a value which, in turn, has been transmitted, from the card to the device in question, during a procedure for verifying the authenticity of the card. Consequently, it is assured that, while the authenticity check occurs, the value stored in the storage unit (specifically in an internal counter therein) is a correct representation of the corresponding value stored on the card. If the authenticity check is unsuccessful, in other words if the card is not judged authentic by the verification procedure, the counter value transmitted to the device is not used. In essence, thus together with the authenticity check of the card, an authenticity check of the counter data occurs. The authenticity check thereby acquires a supplementary function, without the verification procedure itself having to be extended for this purpose. The supplementary circuits required for implementing the method according to the invention, may therefore, apart from the storage elements (counters) required and the circuits for effecting the verification procedure, comprise only means for selectively passing the balance value(s) transmitted. An alternative possibility is, inter alia, that of resetting, in response to failure of the authentication, a relative counter, i.e., one which exclusively retains the last value read out. This, in principle, does not require supplementary circuits.

It will be understood by those skilled in the art that the invention is not limited to the illustrative embodiments depicted above and that many modifications and additions may be made without departing from the spirit and scope of the present invention.

What is claimed is:

1. A method of recording payment data of a card-operated device, the device being capable of exchanging data with a card, said card being capable of registering payment data therein and the payment data relating to a transaction performed by a user with the device, the method comprising the steps of:

within the card, forming a first message and communicating the first message to said device, the first message containing an initial value of a balance then stored within a memory situated on the card, the initial value of the balance representing an unused pre-paid monetary amount then available for payment by the user for a transaction to be effectuated with the card and through the device;

forming, within the device and in response to usage of the device during the transaction, at least one decrease command and routing the decrease command from the device to the card, wherein said decrease command instructs the card to decrease the balance stored in the memory by a pre-defined amount;

in the card, updating, in response to said decrease command, the balance then stored in the memory on the card so as to form a current value of the balance stored therein;

within the device and at a proximate conclusion of said transaction, generating a data request and communicating said data request from the device to the card;

forming, in the card, in response to said data request, a second message and communicating the second message to the device, said second message containing a value representing the current balance then existing in the memory on the card; and within the device, determining a total amount spent by the user for the transaction in response to a difference between the initial and current values of the balance.

2. The method of claim 1 further comprising the step of: within the device, generating, in response to insertion of the card into the device and establishment of electrical communication therebetween, a first request and communicating the first request from the device to the card; and wherein the first and second message define first and second responses, respectively, and said data request defines a second request and the first message forming step is responsive to the first request.

3. The method of claim 1 further comprising the step of cumulatively updating a usage counter situated within the device by adding the total amount to contents of the usage counter so as to form an accumulated result and storing the accumulated result into-the usage counter whereby the contents of the usage counter reflect accumulated charges incurred through use of the device.

4. The method in claim 3 further comprising the steps of:
producing within the device, a unique random number for each of said first and second requests so as to form first and second random numbers; and
said first request generating step and said data request generating step each includes the step of incorporating an authentication code within each of said first and second requests, wherein the authentication code for each of said first and second requests contains said first and second random numbers, respectively.

5. The method of claim 4 wherein said first message forming step comprises the step of generating a first authentication code in response to the first random number and the initial value of the balance.

6. The method of claim 4 wherein the first authentication code generating step comprises the step of generating the first authentication code as a function of the first random number, the initial value of the balance and data identifying the card.

7. The method of claim 5 wherein said first message forming step further comprises the step of producing said first response by cryptographically encoding said first authorization code.

8. The method of claim 7 further comprising the step of, in said device, verifying authenticity of said first response by regenerating the first authentication code, in response to said first random number, so as to define a regenerated first authentication code and determining whether the regenerated first authentication code matches the first authentication code produced by the card and, in response thereto, recovering the initial value of the balance from said first response and storing the initial value of the balance in said device.

9. The method of claim 4 wherein said second message forming step comprises the step of generating a second authentication code as a function of the second random number and the current value of the balance.

10. The method of claim 9 wherein said second response forming step further comprises the step of producing said second response by cryptographically encoding said second authorization code.

11. The method of claim 10 further comprising the step of, in said device, verifying authenticity of said second response by regenerating the second authentication code, in response to the second random number, so as to define a regenerated second authentication code and determining whether the regenerated second authentication code matches the second authentication code produced by the card and, in response thereto, recovering the current value of the balance from said second response and storing the current value of the balance in said device.

12. The method of claim 11 wherein the data request forming and second message forming steps are repeated in succession a plurality of times while said transaction is occurring so as to verify the balance then stored in the memory of the card, such that a plurality of corresponding second random numbers are generated, with each one of said second random numbers being incorporated within a corresponding one of a plurality of second requests.

13. The method of claim 12 further comprising the step of separately verifying, in response to each of said second responses, the authenticity of said each second response by determining whether an associated authentication code regenerated in the device, in response to an associated random number, matches a corresponding authentication code received from the card and, in response thereto, recovering the current value of the balance from said each second response and storing the current value of the balance, as the balance, in said device.

14. The method of claim 4 wherein the balance updating step performed in the card comprises the step of decreasing the balance stored in the card either by a pre-defined amount specified by the decrease command or a fixed amount.

15. The method of claim 4 wherein the card is a pre-paid telephone payment card and the device is a card-operated pay telephone.

16. The method of claim 1 wherein the data request forming and second message forming steps are repeated a number of times in succession while the transaction is occurring so as to repeatedly transfer the current value of the balance from the card to the device during the transaction.

17. The method of claim 16 further comprising the step of updating, after each time the balance has been transferred to the device, a usage counter situated within the device by adding the total amount to contents of the usage counter so as to form an accumulated result and storing the accumulated result into the usage counter whereby the contents of the usage counter reflect accumulated charges incurred through use of the device.

18. Apparatus for recording payment data of a card-operated device, the device being capable of exchanging data with a card, said card being capable of registering payment data therein and the payment data relating to a transaction performed by a user with the device, the apparatus comprising:
a card having:
a memory;
means for forming a first message and communicating the first message to a card-operated device, the first message containing an initial value of a balance then stored within the memory situated on the card, the initial value of the balance representing an unused pre-paid monetary amount then available for payment by the user for a transaction to be effectuated with the card and through the device;
means for updating, in response to a decrease command, the balance then stored in the memory so as to form a current value of the balance stored therein;
means for forming in response to a data request, a second message and communicating the second response to the device, said second message containing a value representing the current value of the balance then existing in the memory; and
the card-operated device having:
means for forming, in response to usage of the device during the transaction, at least one decrease command and routing the decrease command from the device to the card, wherein said decrease command instructs the card to decrease the balance stored in the memory by a pre-defined amount;
means, operative at a proximate conclusion of said transaction, for generating a data request and communicating said data request to the card; and means for determining a total amount spent by the user for the transaction in response to a difference between the initial and current values of the balance.

19. The apparatus of claim 18 further comprising, within the device, means, operative in response to insertion of the card into the device and establishment of electrical communication therebetween, for generating a first request and communicating the first request from the device to the card; wherein the first and second message define first and second responses, respectively, and the data request defines a second request and the first message forming and communicating means is responsive to the first request.

20. The apparatus of claim 19 further comprising means for cumulatively updating a usage counter situated within the device by adding the total amount to contents of the usage counter so as to form an accumulated result and storing the accumulated result into the usage counter whereby the contents of the usage counter reflect accumulated charges incurred through use of the device.

21. The apparatus in claim 19 further comprising:
   means, within the device, for producing a unique random number for each of said first and second requests so as to form first and second random numbers; and
   said first request generating means and said data request generating means each comprises means for incorporating an authentication code within each of said first and second requests, wherein the authentication code for each of said first and second requests contains said first and second random numbers, respectively.

22. The apparatus of claim 21 wherein said first message forming means comprises means for generating a first authentication code in response to the first random number and the initial value of the balance.

23. The apparatus of claim 21 wherein said first authentication code generating means generates the first authentication code as a function of the first random number, the initial value of the balance and data identifying the card.

24. The apparatus of claim 22 wherein said first message forming means further comprises means for producing said first response by cryptographically encoding said first authorization code.

25. The apparatus of claim 24 further comprising means, located in the device, for verifying authenticity of said first response by regenerating the first authentication code, in response to said first random number, and determining whether the regenerated first authentication code matches the first authentication code produced by the card, and in response thereto, recovering the initial value of the balance from said first response and storing the initial value of the balance in said device.

26. The apparatus of claim 21 wherein said second message forming means comprises means for generating a second authentication code as a function of the second random number and the current value of the balance.

27. The apparatus of claim 26 wherein said second response forming means further comprises means for producing said second response by cryptographically encoding said second authorization code.

28. The apparatus of claim 27 further comprising means, located in the device, for verifying authenticity of said second response by regenerating the second authentication code, in response to the second random number, so as to define a regenerated second authentication code and determining whether the regenerated second authentication code matches the second authentication code produced by the card and, in response thereto, recovering the current value of the balance from said second response and storing the current value of the balance in said device.

29. The apparatus of claim 21 wherein the balance updating means decreases the balance stored in the card either by a pre-defined amount specified by the decrease command or a fixed amount.

30. The apparatus of claim 21 wherein the card is a pre-paid telephone payment card and the device is a card-operated pay telephone.

31. A card-operated device for use in apparatus for recording payment data of a card-operated device, the device being capable of exchanging data with a card, said card being capable of registering payment data therein and the payment data relating to a transaction performed by a user with the device, the device comprising:
   means for receiving, a first message from the card, said first message having an initial value of a balance stored in the card;
   means for forming, in response to usage of the device during the transaction, at least one decrease command and routing the decrease command from the device to the card, wherein the decrease command instructs the card to decrease the balance stored therein by a pre-defined amount;
   means, operative at a proximate conclusion of the transaction, for generating a data request to the card so as to obtain a current value of the balance then stored in the card and for receiving a second message having the current value of the balance then stored in the card; and
   means for determining a total amount spent by the user for the transaction in response to a difference between the initial and current values of the balance.

32. The apparatus of claim 31 wherein the receiving means further comprises means for generating a first request to the card to obtain the value of the initial balance stored therein and for communicating the first request to the card so as cause the card to generate the first message; and wherein the data request defines a second request.

33. The apparatus of claim 31 further comprising means for cumulatively updating a usage counter situated within the device by adding the total amount to contents of the usage counter so as to form an accumulated result and storing the S accumulated result into the usage counter whereby the contents of the usage counter reflect accumulated charges incurred through use of the device.

34. The apparatus of claim 33 further comprising:
   means for producing within the device, a unique random number for each of said first and second requests so as to form first and second random numbers; and
   said first and second request generating means each comprises means for incorporating an authentication code within each of said first and second requests, wherein the authentication code for each of said first and second requests contains said first and second random numbers, respectively.

35. The apparatus of claim 34 further comprising means for verifying authenticity of a first response received from the card, as a result of said first request, by regenerating the first authentication code, in response to the first random number, so as to define a regenerated first authentication code and determining whether the first regenerated authentication code matches the first authentication code produced by the card and, in response thereto, recovering the initial value of the balance from said first response and storing the initial value of the balance in said device.

36. The apparatus of claim 34 further comprising means for verifying authenticity of a second response received from the card, as a result of said second request, by regenerating a second authentication code, in response to the second random number, so as to define a regenerated second authentication code and determining whether the regenerated second authentication code matches the second authentication code produced by the card and, in response thereto, recovering the current value of the balance from said second response and storing the current value of the balance in said device.

37. The apparatus of claim 34 wherein the balance updating means decreases the balance stored in the card either by a pre-defined amount specified by the decrease command or a fixed amount.

38. The apparatus of claim 34 wherein the device is a card-operated pay telephone.

* * * * *